United States Patent [19]

Baker

[11] Patent Number: 5,484,173

[45] Date of Patent: Jan. 16, 1996

[54] FLOWING ARCH EXPANSION JOINT USING FEP LINER BONDED TO FIBERGLASS FABRIC LAYER AND REINFORCED WITH PLURALITY OF FABRIC PLIES COVERED WITH ELASTOMERIC OUTER LAYER

[75] Inventor: Stephen F. Baker, Phelps, N.Y.

[73] Assignee: Garlock Inc., New York, N.Y.

[21] Appl. No.: 304,052

[22] Filed: Sep. 12, 1994

[51] Int. Cl.[6] ................................................ F16L 21/00
[52] U.S. Cl. .......................... 285/229; 285/423; 138/137
[58] Field of Search ................................. 285/226, 227, 285/228, 229, 235, 236, 423; 138/121, 122, 128, 137, 153, 170

[56] References Cited

U.S. PATENT DOCUMENTS

| | | | |
|---|---|---|---|
| 2,703,109 | 3/1955 | Saville | 285/235 X |
| 3,580,616 | 5/1971 | Merkwacz | 285/229 |
| 4,098,528 | 7/1978 | Stanley | 285/235 |
| 4,241,944 | 12/1980 | Clark | 265/423 X |
| 4,732,413 | 3/1988 | Bachmann | 285/229 X |
| 5,147,695 | 9/1992 | Colley et al. | 285/229 X |

*Primary Examiner*—Dave W. Arola
*Attorney, Agent, or Firm*—Howard S. Reiter

[57] ABSTRACT

An improved flowing arch expansion joint includes a fiberglass body layer having an overlapping longitudinal seam that are bonded together by a layer of heat flowable fluoropolymer material. The radial expansion strength of the joint is enhanced by a supplemental peripheral reinforcing strip extending over less than the entire axial length of the joint, in the area of the maximum diameter portion, only. The peripheral reinforcing strip is formed by a winding process in which tire cord-based strip material is wound at a laying angle as close as possible to ninety degrees relative to the axis of the joint.

9 Claims, 3 Drawing Sheets

FLOWING ARCH EXPANSION JOINT USING FEP LINER BONDED TO FIBERGLASS FABRIC LAYER AND REINFORCED WITH PLURALITY OF FABRIC PLIES COVERED WITH ELASTOMERIC OUTER LAYER

BACKGROUND OF THE INVENTION

This invention relates generally to "flowing arch" expansion joints and more particularly to an improved layered construction for such joints. The nature and background of "flowing arch" expansion joints, also known as "shallow arch" joints, are thoroughly described in prior U.S. Pat. No. 4,241,944 which is assigned, also, to the assignee of the present invention.

As described in the cited prior patent, the text of which is considered to be incorporated by reference into this application, resilient expansion joints generally take one of two principal forms. The shallow or flowing arch, is one form, and the other is known variously as a narrow arch or abrupt arch, but these other types of expansion joints form no part of this invention.

In the past, flowing arch joints have been fabricated using built-up winding techniques and/or related molding processes, for the purpose of achieving the desired "bulged cylinder" shape in the conduit that forms the central part of such a joint. It has been explained in the cited prior art patent, among others, that flexibility and pressure-resistant strength are two important structural requirements of flowing arch expansion joints.

The shape of so-called narrow arch joints tends to lead naturally to certain physical characteristics, such as desirable radial strength, that are not present to an equivalent extent in the flowing arch shape. As a result, materials and techniques used acceptably in the construction of narrow arch joints in the past, have been considered unacceptable and/or undesirable for use in flowing arch joints. Specifically, narrow-arch joints known in the prior art, such as catalog items 200 and 200HP, manufactured and sold by the Assignee of the present invention, have incorporated an inner "liner" layer of fluoropolymer material such as FEP (fluorinated ethylene propylene), surrounded by a layer of fiberglass fabric material which is in turn surrounded by one layer of elastomeric material and reinforced with a plurality of fabric plies and steel rings and further covered with an outer layer of elastomeric material. In this prior art construction, heating of the layered materials in a confining jacket, has been used to cause the inner layer of FEP material and the surrounding layer of elastomeric material to mechanically bond to the interposed fiberglass fabric layer.

Am expansion joint construction having fiberglass fabric in contact with the FEP liner and extending from one end of the expansion joint to the other, has not been used previously in the manufacture of flowing arch expansion joints because it was believed that the fabric material would not accommodate the range of flexibility required; it was believed also, that such a construction could not be made to withstand the pressure forces generated when pressurized fluids are contained within the passage through the expansion joint. Tests have demonstrated that fiberglass-layer construction, of the type previously used in narrow arch joints, often results in separation of the fiberglass fabric seam and subsequent failure of the joint when used in flowing arch construction, without benefit of this invention.

SUMMARY OF THE INVENTION

Accordingly, it is an object of this invention to provide an improved flowing arch expansion joint having a construction incorporating an inner liner of FEP material and a surrounding layer of elastomeric material, both mechanically bonded to an intermediate layer of fiberglass fabric, and reinforced with a plurality of fabric plies covered with an elastomeric outer layer.

It is another object of this invention to provide such a flowing arch expansion joint that has improved radial strength.

It is still another object of this invention to provide such an expansion joint that is lighter in weight and relatively easier to manufacture than the prior art abrupt arch FEP lined expansion joints.

These and other and further objects, features and advantages of this invention will be made apparent to those having skill in this art by the following specification, taken in conjunction with the accompanying drawings, in which:

DETAILED DESCRIPTION

Figure 1:
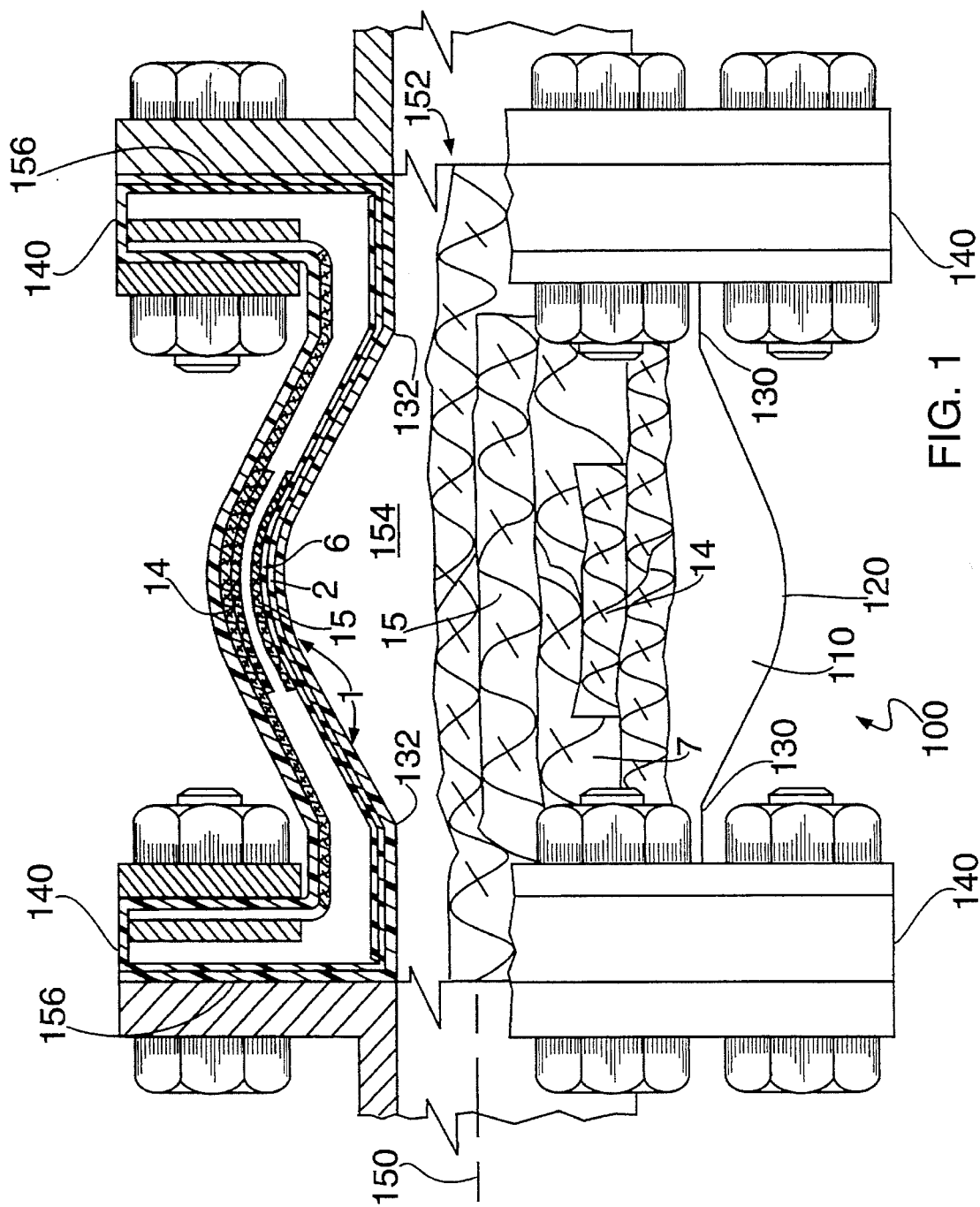
FIG. 1 illustrates partly in cross section, and partly cutaway, the novel joint construction of the present invention.

Referring now more specifically to the drawings, in FIG. 1 a preferred embodiment of a flowing arch expansion joint according to this invention may be seen to comprise a body member 100 of given length having a central bulged cylinder portion 110 characterized by a central flowing arch portion 120 having a cylindrical portion 130 integrally extending from each end 132, and an integral radial flange portion 140 extending from the opposite end of each cylindrical portion 130. Subject to the requirements of particular applications, the relative diameters of portions 130 may differ from each other or they may be equal.

Central arch portion 120, cylindrical portions 130 and flanges 140 together define a substantially continuous structure of generally tubular configuration having a central axis 150 with a hollow axial passage 152 defined by the inner wall surface 154 of body member 100.

Figure 3:
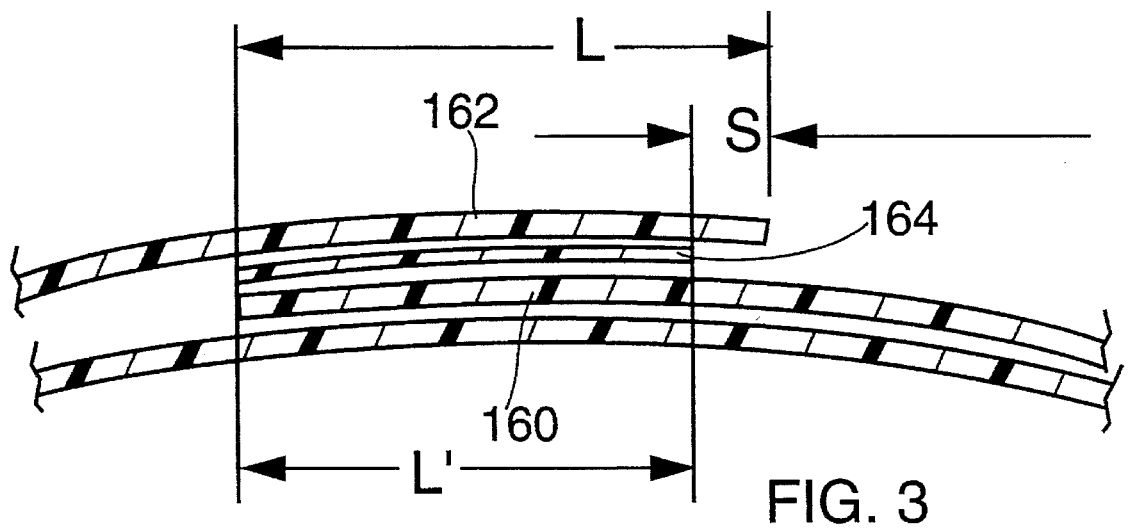
FIG. 3 illustrates a transverse cross section of the layers that make up a wall of the expansion joint of FIG. 1 shown prior to heating.

The structure of body member 100 comprises an inner surface liner layer 1 of a heat-flowable fluoropolymer material such as fluorinated ethylene propylene (FEP) that extends continuously along and around the entire inner surface 154 of axial passage 152 and further extends radially outwardly over the entire end surface area of each axially opposite-facing end surface 156 of flanges 140. Immediately surrounding liner layer 1 is a layer of woven fiberglass material 2 mechanically bonded to layer 1 by heating that causes "wicking action" penetration of FEP layer 1 into the interstices of fiberglass layer 2. Immediately surrounding fiberglass layer 2 is a layer of any suitable heat-flowable elastomeric material 6 that is mechanically bonded to fiberglass layer 2 by heating, in substantially the same manner as the bonding of FEP layer 1 to fiberglass layer 2. Suitable elastomers include: natural rubber, neoprene, chlorobutyl and the like. As shown in FIG. 3, fiberglass layer 2 comprises a bulged cylinder-shaped layer of woven fiberglass fabric or the like, circumferentially wrapped about central axis 150 and having overlapping longitudinal edge portions 160, 162 that are bonded together by an interposed, longitudinally extending bonding strip of heat-flowable fluorocarbon material 164, such as FEP or the like. Edges 160, 162 overlap along a given length portion of the circumference of the body 110.

For tubular cylindrical end portions 130 having an effective diameter not substantially less than about three inches (3") and not substantially greater than, for example, about twenty inches (20"), the overlap L of edge portions 160, 162 should be not substantially less than two inches (2") of circumference. Bonding strip 164 preferably should be of a lesser width L than the overlap, for example, about one and one-half inches (1.5"), to help assure that flow of the material of strip 164 as the result of heat applied during manufacture, does not cause the flurocarbon resin material to flow out of the overlap area beyond the terminal end 165 of the radially outermost edge 162 and onto the outer surface of the woven fiberglass material 2. It has been discovered that the presence of material from bonding strip 164 on the outer surface of fiberglass layer 2 in the area of the terminal end 165 of edge portion 162 can interfere with proper bonding of the innermost surface of elastomeric surrounding layer 6 to the outermost surface of fiberglass layer 2.

Figure 2:
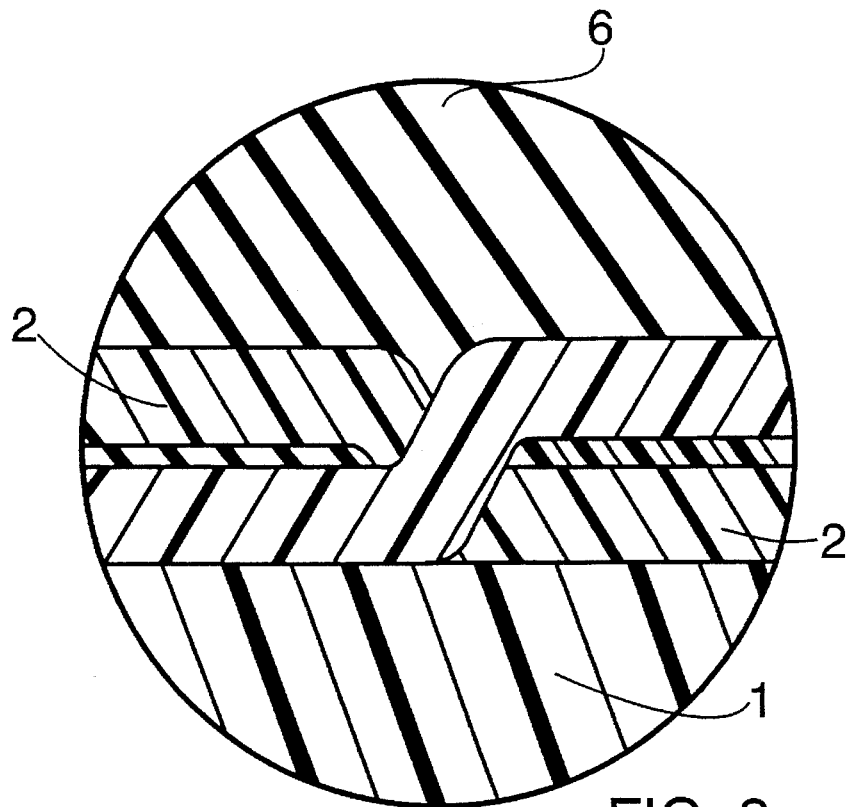
FIG. 2 illustrates in cross-sectional detail a portion of the bonded-together layers that make up the wall of the expansion joint illustrated in FIG. 1.

Referring again to FIG. 2, the built-up construction formed by innermost layers 1, 2 and 6 may be seen to be surrounded concentrically by successive, substantially abutting reinforcing layers 7 formed of strips of material defined by two or more strands of reinforcing cord of the type used in automobile tires (e.g., "tire cord" filament) embedded in a body of heat-flowable and fusible elastomeric material. In this regard, "fusible" material bonds to itself when heated so as to form a substantially continuous film or layer of elastomeric material having the helically wound tire cord embedded therein. The reinforcing layers are constructed by a winding process that is fully disclosed in the specification of related prior art U.S. Pat. No. 4,241,944, and may be used in substantially the same manner in the manufacture of expansion joints in accordance with this invention. The laying angle of such reinforcing strips, for the purposes of this invention may be in the range of 80° to about 90°.

A departure from the construction disclosed in U.S. Pat. No. 4,241,944, and a unique feature of the present invention, is the inclusion, among reinforcing layers 7, of one or more supplementary peripheral reinforcing strips such as 14, 15. The laying angle of peripheral strips 14, 15 preferably should be as close to ninety degrees (90°) as possible to achieve maximum reinforcing effect, in accordance with this invention. The function of strip 14, and any additional such strips that may be included, is to reinforce specifically, the outward radial strength of flowing arch portion 120 without adversely affecting the ability of the expansion joint to accommodate axial expansion and compression. Circumferential reinforcing layers 7 extend from end to end of the joint (i.e., from flange to flange) and are wound at an acute laying angle relative to the axis 150 in accordance with prior art practice in the construction of abrupt-arch expansion joints. However, it has been found that significantly enhanced radial reinforcing strength is achieved when reinforcing strip (or strips) 14 is wound at a laying angle as close to ninety degrees (90°) as possible, and strip 14 is made to extend axially along no more than the axial length of the bulged cylinder central portion 120.

Figure 4:
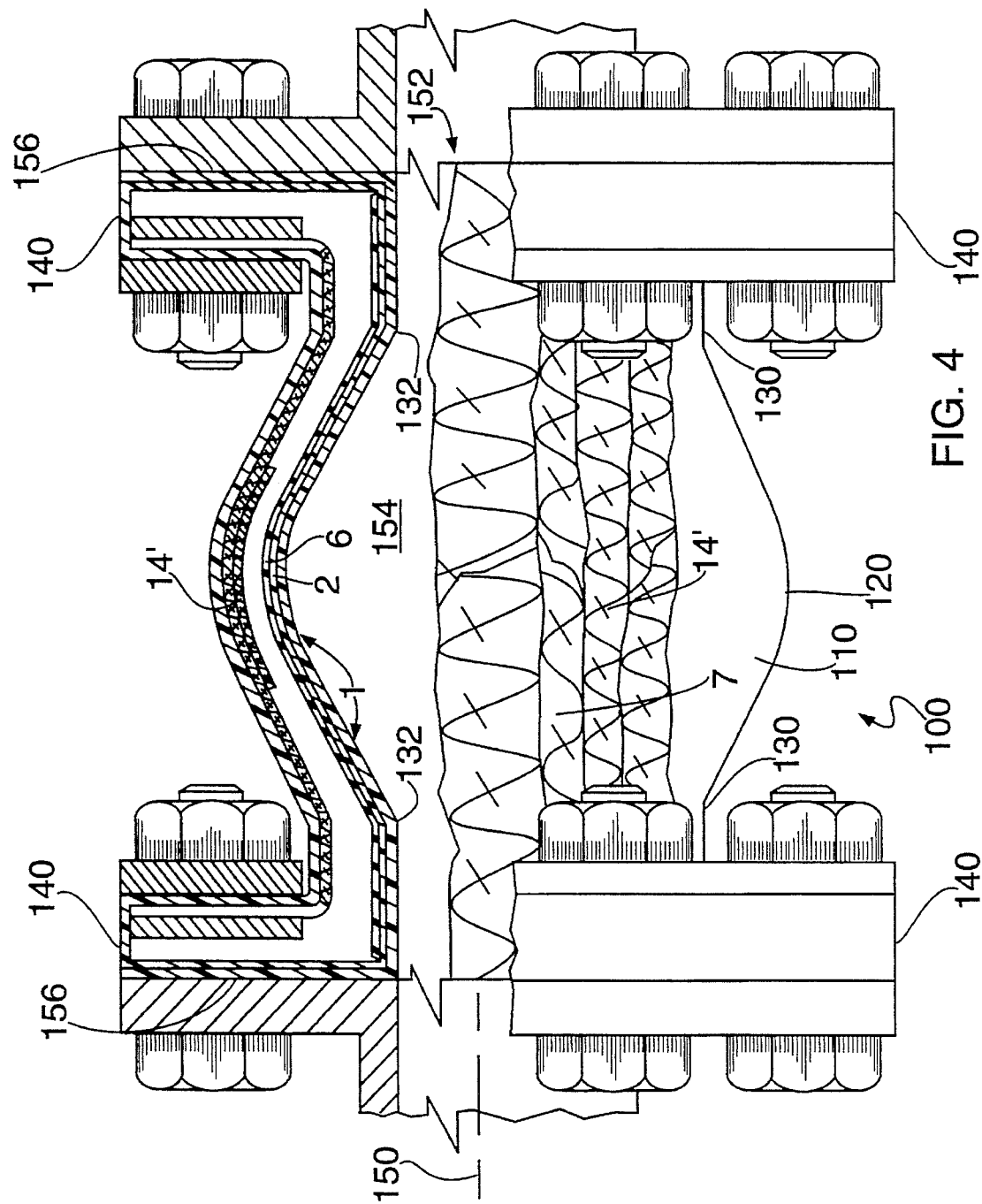
FIG. 4 illustrates another embodiment of the novel joint construction of FIG. 1.

For purposes of clarity, FIG. 4 illustrates the cross section of a portion of an expansion joint in accordance with this invention, having only one reinforcing strip 14, while FIG. 1 illustrates a similar cross section having a plurality of such strips (identified as 14 and 15). As seen in FIG. 1, strip 14 extends along less than the entire length of body 100 and preferably is coextensive with the axial extent of bulged cylinder central portion 120. Strip 15 shows that a supplemental reinforcing strip may have an axial length less than the extent of portion 120, but it is preferably at least in part coplanar with the maximum diameter of portion 120. In this regard, "coplanar" indicates that a plane drawn transverse to the axis 150 and coinciding with the maximum diameter of bulged cylinder portion 120, will intersect with strips 14, 15 and the like.

It is pointed out, elsewhere in this specification, that the materials that form layers 1, 6 and 164 are of the type characterized by the ability to "flow" when subjected to heat, preferably in excess of the anticipated operating temperature of the expansion joint. In the process of manufacturing a flowing arch expansion joint, the body, after being fully wound with each of the layers described herein and more fully described in part in U.S. Pat. No. 4,241,944, is subjected to vulcanized heat, as described in U.S. Pat. No. 4,241,944, to cause the polymeric materials of layers 1, 6 and 164 to flow, so as to penetrate the interstices of woven fabric layer 2, by wicking action as suggested buy the prior art. However, it has been found that, for the purposes of this invention, the flowable material should not penetrate substantially through the fiberglass layer. This reduces interference with bonding of a separate layer on the opposite side of the fiberglass and enhances performance of a joint in accordance with this invention. Accordingly, the physical parameters of fabric layer 2 are selected, in combination with the flow characteristics of layers 1, 6 and 164 at selected temperatures, to assure that the flowing material will "wick" into, but not through, the fabric of layer 2 to achieve desirable bounding strength.

While this invention has been particularly shown and described with respect to a particular embodiment, it will be understood by those skilled in the art that changes in form and details may be made therein without departing from the scope and spirit of this invention. Accordingly, it is intended, and should be clearly understood, that the invention is intended to be limited only as it is set forth in the following claims.

I claim:

1. A flowing arch expansion joint, comprising:

an inner liner layer of heat-flowable fluoropolymer material;

a layer of fiberglass fabric mechanically bonded to said inner liner layer by wicking penetration of said heat-flowable fluoropolymer into the structure of said fiberglass fabric as the result of heating to an elevated temperature;

said fiberglass layer and said inner liner layer being shaped into a bulged cylinder configuration having a given overall length with a maximum diameter portion intermediate the ends thereof and a minimum diameter portion proximate at least one end thereof;

said layer of fiberglass fabric having longitudinally extending overlapping edges defining a seam with said edges overlapping each other along a portion of the circumference of said bulged cylinder and having interposed therebetween a layer of heat flowable fluoropolymer material mechanically bonded to the fabric that forms both edges and securing said edges together against relative motion;

a surrounding layer of heat-flowable elastomeric material surrounding the outer periphery of said fiberglass layer from end to end thereof;

said surrounding elastomeric layer being mechanically bonded to said fiberglass fabric layer by wicking penetration of said heat-flowable elastomeric material into the structure of said fiberglass fabric as the result of heating to an elevated temperature.

2. A flowing arch expansion joint in accordance with claim 1, wherein:

said layer of fluoropolymer material interposed between said overlapping edges of said fiberglass layer extends over less than the circumferential length of the overlap between said overlapping edges, and is terminated short of the terminal end of the radially outermost overlapping edge such that the material of said fluoropolymer layer does not tend to flow out from under the outermost overlapping edge when it is heated.

3. A flowing arch expansion joint in accordance with claim 1, wherein:

the thickness of said inner lining layer and the thickness of said fiberglass layer are selected relative to each other such that the wicking of said inner lining layer during heating allows the material of said inner lining layer to penetrate into but not substantially through the thickness of said fiberglass layer.

4. A flowing arch expansion joint in accordance with claim 3, wherein:

the thickness of said layer of fiberglass fabric and the thickness of said surrounding layer of elastomeric material are selected relative to each other such that the wicking of said surrounding elastomeric layer during heating allows said elastomeric material to penetrate into but not substantially through the thickness of said fiberglass layer.

5. A flowing arch expansion joint in accordance with claim 1, further comprising:

at least one circumferential reinforcing layer formed of filament embedded in heat-flowable elastomeric material encircling the full length of said expansion joint and extending axially substantially from one end thereof to the other; said circumferential reinforcing layer being superposed upon said surrounding layer of elastomeric material; and said circumferential reinforcing layer and said surrounding layer being bonded to each other.

6. A flowing arch expansion joint in accordance with claim 5, wherein:

said at least one circumferential reinforcing layer comprises a plurality of such circumferential reinforcing layers arranged in radially concentric relationship surrounding said fiberglass layer, and said circumferential reinforcing layers are bonded together.

7. A flowing arch expansion joint in accordance with claim 6 further comprising:

at least one peripheral reinforcing strip of heat-flowable elastomeric material encircling no more than a portion of the axial length of said expansion joint in the area of the maximum diameter portion of said bulged cylinder configuration.

8. A flowing arch expansion joint in accordance with claim 7 wherein:

said at least one peripheral reinforcing strip is incorporated between two adjacent circumferential reinforcing layers such that it is maintained in its physical position relative thereto by the bonding together of said circumferential reinforcing layers.

9. A flowing arch expansion joint in accordance with claim 8, wherein:

said at least one peripheral reinforcing strip comprises a plurality of such peripheral reinforcing strips in radially concentric relationship in the vicinity of the maximum diameter portion of said bulged cylindrical configuration, at least a pair of said plurality of peripheral reinforcing strips being spaced from each other by an interposed circumferential reinforcing layer.

* * * * *